United States Patent
Kaza et al.

(10) Patent No.: US 9,992,483 B2
(45) Date of Patent: Jun. 5, 2018

(54) IMAGING ARCHITECTURE FOR DEPTH CAMERA MODE WITH MODE SWITCHING

(71) Applicant: INTEL CORPORATION, Santa Clara, CA (US)

(72) Inventors: Krishna Kaza, Fremont, CA (US); Vivek Kumar, San Jose, CA (US); Kabeer R. Manchanda, San Jose, CA (US); Sreenivasulu Gosangi, San Diego, CA (US); Jianxu Zheng, Beijing (CN); Lei Chen, Beijing (CN); Wen Wang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 256 days.

(21) Appl. No.: 14/576,792

(22) Filed: Dec. 19, 2014

(65) Prior Publication Data
US 2016/0065934 A1    Mar. 3, 2016

Related U.S. Application Data

(60) Provisional application No. 62/045,258, filed on Sep. 3, 2014.

(51) Int. Cl.
*H04N 5/247* (2006.01)
*H04N 13/02* (2006.01)
*G01B 11/245* (2006.01)

(52) U.S. Cl.
CPC ....... *H04N 13/0296* (2013.01); *G01B 11/245* (2013.01); *H04N 13/0271* (2013.01)

(58) Field of Classification Search
CPC ............. G01B 11/245; H04N 13/0271; H04N 13/0296

(Continued)

(56) References Cited

U.S. PATENT DOCUMENTS

2006/0187310 A1* 8/2006 Janson, Jr. ........... H04N 5/2254
                                                            348/218.1
2008/0218613 A1* 9/2008 Janson .................... G03B 15/00
                                                              348/262

(Continued)

FOREIGN PATENT DOCUMENTS

JP       2012/103109    5/2012
KR    10-2007-0081962   8/2007
KR    10-2009-0085991   8/2009

OTHER PUBLICATIONS

Aja Hi5—3D Mini Converter https://www.amazon.com/AJA-Hi5-3D-Mini-Converter-Multiplexer/dp/B004JLDQ16 Feb. 10, 2012.*

(Continued)

*Primary Examiner* — Jamie Atala
*Assistant Examiner* — James Boylan
(74) *Attorney, Agent, or Firm* — Womble Bond Dickinson (US) LLP

(57) ABSTRACT

An imaging architecture is described for a depth camera mode with mode switching. In one example, an imaging device has a primary camera to capture an image of a scene, a secondary camera to capture an image of the same scene, a third camera to capture an image of a second scene, a processor having a first port coupled to the primary camera to receive images from the primary camera and a second port to receive images, and a multiplexer coupled to the secondary camera and to the third camera to receive the captured images and to alternately couple the secondary camera or the third camera to the second port of the processor.

20 Claims, 7 Drawing Sheets

(58) Field of Classification Search
USPC .......................................................... 348/48
See application file for complete search history.

(56) References Cited

U.S. PATENT DOCUMENTS

| | | | | |
|---|---|---|---|---|
| 2012/0176481 A1* | 7/2012 | Lukk | ................ | H04N 13/0011 |
| | | | | 348/47 |
| 2012/0195583 A1* | 8/2012 | Pace | .................... | G03B 35/08 |
| | | | | 396/326 |
| 2013/0057697 A1* | 3/2013 | Pace | .................... | H04N 5/225 |
| | | | | 348/159 |
| 2014/0218357 A1* | 8/2014 | Akao | ................ | H04N 13/0011 |
| | | | | 345/419 |
| 2014/0232831 A1* | 8/2014 | Shi | .................... | H04N 13/0242 |
| | | | | 348/48 |
| 2014/0320698 A1* | 10/2014 | Karivaradaswamy | .................... | |
| | | | | H04N 5/23293 |
| | | | | 348/231.99 |
| 2016/0021311 A1* | 1/2016 | Waltermann | ....... | H04N 5/23245 |
| | | | | 348/262 |

OTHER PUBLICATIONS

PCT/US2015/043457, "Notification of Transmittal of the International Search Report and the Written Opinion of the International Searching Authority, or the Declaration" dated Nov. 11, 2015, pp. 17

\* cited by examiner

IMAGING ARCHITECTURE FOR DEPTH CAMERA MODE WITH MODE SWITCHING

CLAIM OF PRIORITY

This application claims the benefit of and priority to U.S. Provisional Patent Application No. 62/045,258, by Krishna Kaza, filed Sep. 3, 2014, the contents of which are incorporated herein by reference.

FIELD

The present description pertains to the field of multiple camera imaging systems and in particular to depth-based effects with multiple cameras.

BACKGROUND

Portable devices, such as computers, tablets, and cellular telephones are commonly equipped with a camera on the front directed to the user and a camera on the back directed away from the user. The front camera is typically used for video conferencing and self-portraits, while the rear camera is typically used for video and still photography.

Small digital cameras have become commonplace on portable telephone, communication, entertainment, and media devices. There is a corresponding increase in the use of cameras for security, navigation, safety, and other uses. Two cameras directed at the same scene from different positions provide stereo vision allowing for depth perception. An array of cameras or image sensors mounted to a single device can also enable many other compelling 3D user experiences, including temporal resolution and increased dynamic range. A variety of different portable photographic, computing, and media player devices can be adapted to integrate camera array technology on their platforms.

A very few products offer two cameras on the back side of the portable device or of a camera to allow stereo or three-dimensional images or video to be taken and recorded. A device with two or more cameras for depth perception allows for a variety of different additional functions. As an example, a depth map can be overlaid on a still image as a tool for enhancing the image. The depth map can be used for motion effects (parallax views), for depth measurement and for applying digital filters that select based on depth, such as refocus, layered filters, and view synthesis, among others.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A multiple image sensor device provides two and three dimensional operation using software and hardware features that enable depth photography. Multiple image sensors are mounted on the same side of the device to each have a different view of the same scene. The images are synchronized and tracked with frame counters using existing components reconfigured to accommodate the additional sensors and to switch between different imaging modes. The portable imaging system quickly changes modes and in some embodiments provides a new depth capture workflow.

The described architecture is able to handle two or more separate synchronized image frames and process the set of images with very low latency. The processing can include generating depth maps by determining image disparity information, as well as calibrating and correcting captured frames. By synchronizing frames, the imaging system is able to eliminate many different causes of errors in disparity calculations, image capture failures and poor image capture performance. Some of these failures come from movement of the device. Other failures come from changes of the scene between frames from different cameras.

Figure 1:
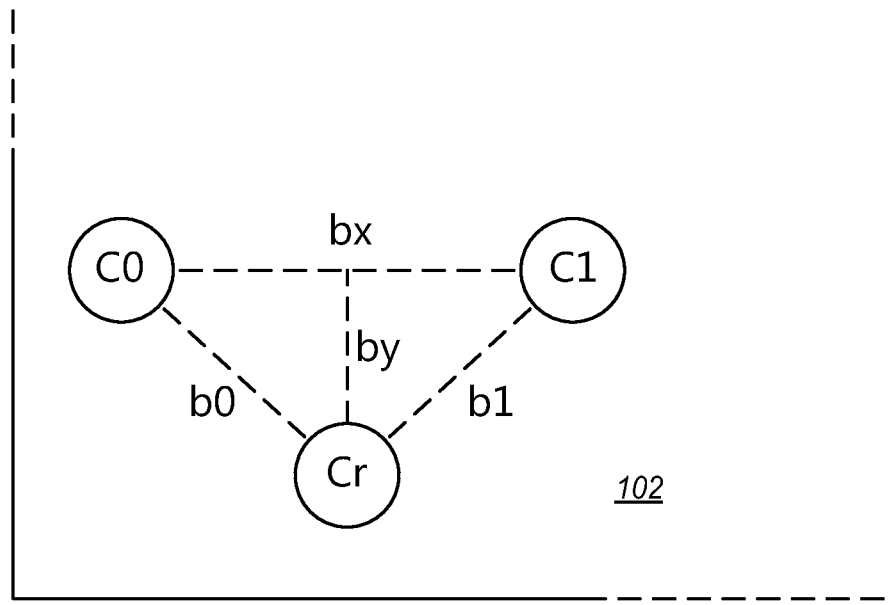
FIG. 1 is a diagram of a camera array on a surface of a device.

FIG. 1 is a diagram of a set of cameras Cr, C0, C1 in a triangle configuration on a surface of a portable device 102. Such a camera or image sensor array may be placed on any surface of the portable device. While the back surface provides many obvious benefits for use with larger scenes, the best surface for the cameras may be adapted to suit the use of the camera or other portable device.

The device 102 has an exterior housing shown as the surface of FIG. 1. The cameras are mounted in a typically fixed position on the surface. The cameras may be near a display, such as a touchscreen display, microphones, speakers and other components on the device. The cameras may be oriented on a front side or a back side of the device and may be oriented toward a user or away from the user. There may a camera on one or more surfaces of the device.

A reference camera Cr is used as the reference point for the position of the other two cameras C0, C1. There may be more or fewer other cameras. The second camera C0 is a specific distance b0 from the reference camera Cr. This distance has a vertical component by and a horizontal component bx. Similarly, the third camera C1 is a distance b1 from the reference camera. This distance is illustrated as but is not necessarily in the opposite direction and the same distance from the reference camera as the second camera.

Any number of additional cameras may be identified with reference to the position of the reference camera. In addition, the distances b0, b1 may also have a component in a third dimension bz (not shown). The array, as shown, is symmetric and even, simplifying the correlation of images from the cameras, however, the embodiments are not so limited.

While two cameras are shown, the embodiments are not so limited. Two or more cameras may be used. While additional cameras add cost to the device, additional cameras may provide a better depth map and may allow for other multiple camera functions to be provided in addition to depth. Costs may be reduced by using a primary high resolution reference camera and lower resolution secondary cameras. The lower resolution images require fewer processing resources but still allow depth to be clearly measured.

As an example, the main imager may be an 8 MP sensor. Two smaller 720p (1 MP) cameras may be used on either side of the large camera. An external ISP (Image Signal Processor) may be used to process and bridge the two smaller cameras onto a single MIPI lane. Alternatively, the primary ISP may process all or some of the secondary streams simultaneously. The output of such a camera configuration may be used to provide 2 streams (e.g. one RAW 8 MP and one YUV 2560×720) simultaneously from all 3 cameras. As described herein, the hardware may synchronize frames for the three cameras. In one embodiment, a first signal will initiate the start of the frames with the reference camera which will serve as a master for the other cameras that will serve as slaves.

Images from the two or more cameras may be used to generate a depth map. The quality of the depth map is improved when all of the frames are synchronized in time as much as possible although many depth algorithms do have a slight tolerance as long as motion is somewhat limited. The synchronized frames enable a more robust 3D camera performance while reducing object blurring from device movement or scene changes. As described below no specialized synchronization hardware or array camera modules are required and a variety of different camera array and system processing configurations are accommodated.

Existing camera sensors and powerful computational techniques combine to generate depth maps from disparity information. Additionally, the system calibrates and corrects the captured frames, cleans them up and adjusts for imperfections in the images after capture. The system is not limited to any particular sensor resolutions or frame capture rates. Enhanced photography use cases including measurement, refocus (bokeh effect), filters (layers), motion effect (parallax views) and view synthesis (moving the camera in and out while changing the focus) are also accommodated.

Figure 2:
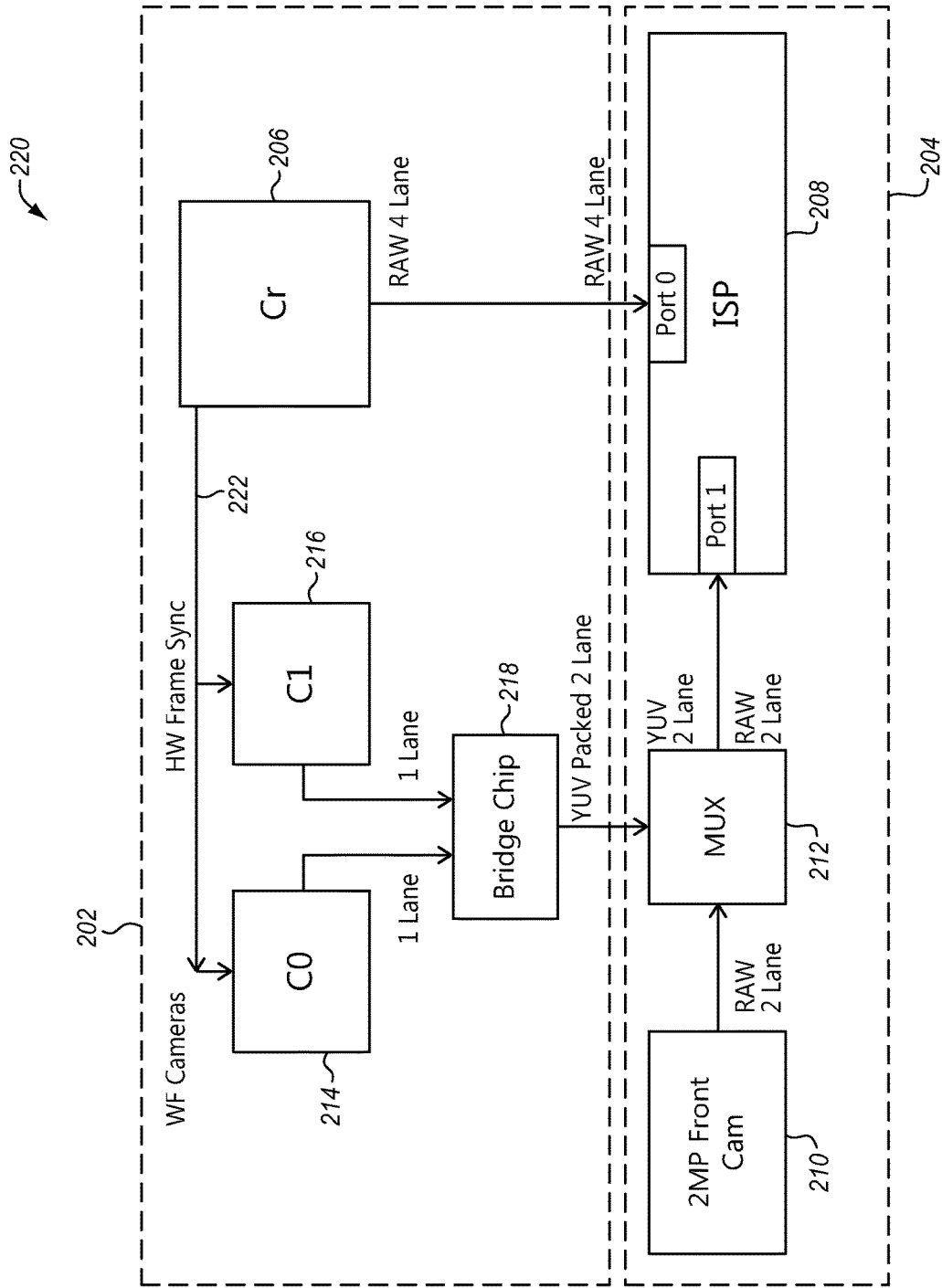
FIG. 2 is a block diagram of a portion of a portable device with a camera assembly according to an embodiment.

FIG. 2 is a block diagram of a portion of a portable device 220. The device has a camera assembly 202 with three cameras 206, 214, 216 as described in the context of FIG. 1. The device also has an internal processing system 204. The internal system is based around an ISP or any other type of processor including even a CPU (Central Processing Unit), depending on the system implementation, controller, and an image processor or similar device 208, depending on the nature of the system. The CPU has two ports. Port 0 receives the high resolution image frames from the primary back camera 206 and Port 1 receives the lower resolution image frames from the secondary front camera 210.

The rear camera is typically used for photograph and video capture while the front camera is typically used for video calls and perhaps gesture recognition. In some cases, both the front and the back cameras may be operating at the same time and the CPU processes frames from both image sensors. This might allow, for example, a video conference to be conducted with a remote person in combination with presenting a second image or video of a nearby scene. When used for remote repair assistance, for example, the device might send a video stream of the local repair technician from the front camera and also a video stream of the broken part or a repair process from the back camera. These may be combined as picture-in-picture or sent as separate streams so that the remote viewer can see one or both.

In addition to the standard back camera, the system 220 includes two additional secondary cameras 214, 216 in the camera array 202. These two cameras are both coupled to a bridge circuit 218. The bridge circuit combines frames from the two secondary cameras and provides the combined frame to a multiplexer 212. The multiplexer is positioned between the front camera 210 and the CPU 208. The multiplexer is controlled by the CPU so that on command it switches the input at Port 1 from the front camera 210 to the two secondary cameras 214, 216.

While the secondary cameras are shown as being secondary to the back camera, a similar approach may be used to provide secondary front cameras (not shown) for the front main camera 210. Using a similar bridge circuit and a multiplexer between the back camera 206 and the CPU 208, a multiplexer might be able to feed front secondary cameras to the CPU on Port 0 while the front camera feeds into Port 1. As mentioned above, the position and location of the various cameras may be modified to suit a variety of different implementations.

The bridge circuit combines two frames, one from each of the secondary cameras into a single frame. In embodiments, in order to provide all of the captured detail to the CPU, corresponding pixels are not combined or compared in any way. Instead the frames are simply placed side by side to produce one frame with all of the pixels of both frames. For an input WXGA signal, the two 1280×720 frames are placed side by side to produce a single 2560×720 frame or alternatively, a single 1280×1440 frame. The single frame may then be applied to the multiplexer and in turn to Port 1 of the CPU as a single frame. As a result, two images are received as a single frame and the hardware standards, signaling, connections and other characteristics for Port 1 do not require any changes to accommodate two frames instead of one.

The bridge circuit may perform other operations, depending on the nature of the circuit. These functions may include frame synchronization, frame disparity determinations, noise reduction, feature detection, and other functions that may be useful for operations of the CPU. The bridge circuit may also perform format conversions from RAW to YUV, RGB, YCrCb or any other desired format as desired. An image signal processor may be used as the bridge circuit or a simpler FPGA (Field Programmable Gate Array), or other simple logic device may be used.

The camera array may also use the vertical synchronization signal available in camera sensors. A vertical frame synchronization signal line 222 is driven by the reference camera and fed to the two secondary cameras. In this embodiment the initial synchronization line is through a hardware line. This helps to eliminate any lag between the camera start of frame for the secondary cameras. The vertical frame synchronization line may be a dedicated hardware line for a sync signal or it may also be a connection that is used for general software commands or interrupts. The line may use a chip communication bus system or a simple HI/LO trigger interface.

In one embodiment, the reference camera receives a command to take a picture or initiate a video sequence from the CPU 208. The reference camera upon taking the picture or sequence sends a synchronization signal to the secondary cameras so that they also take the picture or initiate the video sequence at this same time. In this way the multiple frames are taken at approximately the same time. Closer synchronization improves the accuracy of the depth measurement. However, due to different resolution sizes and camera integration characteristics processing times maybe different for the different camera streams and as such since an initial synchronization at the start of the frame is not enough to ensure temporal synchronization when the image is captured. An initial synchronization at start of frame is unable to provide resilience from frame buffer drops in either of the imaging pipelines.

In another embodiment, the reference camera also provides frame counter numbers and synchronization signals that are related to a common clock signal to which all of the cameras are connected. The cameras synchronize timing to the clock and frame count values to clock values. The synchronization logic then uses the embedded frame counter from the reference frame to pick the correct matching frames from the multiple capture streams. Frame counter based matching along with initial start of frame synchronization ensure the architecture is able to provide frame synchronization even with image streams having different processing latencies while also being resilient to frame drop failure in the processing pipeline.

In embodiments images from all 3 cameras are used to generate a depth map. The three images are synchronized as much as possible although the depth algorithms do have a slight tolerance as long as motion is somewhat limited.

Other depth photography solutions have not implemented three or more independent sensor frames being synchronized concurrently in the capture mode. The design challenges resolved by embodiments described herein include, but are not limited to, the following: the bandwidth to handle the 3 frames, the number of ports in the SoC's (System on a Chip) ISP or imaging pipeline to handle, and the number of MIPI lanes to process the workflow at or under 1 ms or another measure of latency.

In embodiments synchronized frames enable a more robust 3D camera performance while reducing object blurring from device movement or scene changes. Additionally, no specialized hardware or array camera modules are required while multiple designs or approaches are allowed.

Existing camera sensors are leveraged and combined with powerful computational methods to generate depth maps from disparity information. Additionally, the system calibrates and corrects the captured frames, cleans them up, and adjusts for imperfections in the images as much as is possible after capture. Off the shelf components may be used while still delivering a highly responsive depth capture experience. The sensor resolutions and frame capture rates may be mixed and changed to enable other use cases as needed.

A passive depth processing model used in the depth camera system described herein also allows for enhanced photography use cases including measurement, refocus (bokeh effect), filters (layers), motion effect (parallax views) and view synthesis (moving the camera in and out while changing the focus). The resulting depth information may be post processed. Frame synchronization and frame counting may be done at the hardware level and then three or more cameras may be used in both photo and image capture mode.

The hardware design of FIG. 2 allows the system to toggle between "Depth" and "2D" camera modes for the 8 MP camera by operation of the multiplexer 218. "2D" mode provides the conventional imaging capabilities of the CPU platform with the back camera at Port 0 and the front camera at Port 1. The "Depth" mode may be configured to support preview and capture. The preview would typically be from the larger reference camera. Capture may use the high resolution image of the reference camera, such as a 3264× 1840 (6 Mp or 8 MP or higher). The stereo secondary camera pair is then used to provide the depth in conjunction with the reference camera. The stereo pair may be lower resolution such as 1280×720 (1 MP or 720 p) for each camera.

The system 220 may also offer a dual still image capture operation. The reference camera and a secondary camera may simultaneously capture the same image. Depending on the camera array, the image may be captured in different resolution, formats, etc, such as an 8 MP RAW image with the main reference camera and a 1 MP YUV SBS copy of the same scene. This may provide advantages for reduced data demands for uploading or sending the image to others.

Figure 3:
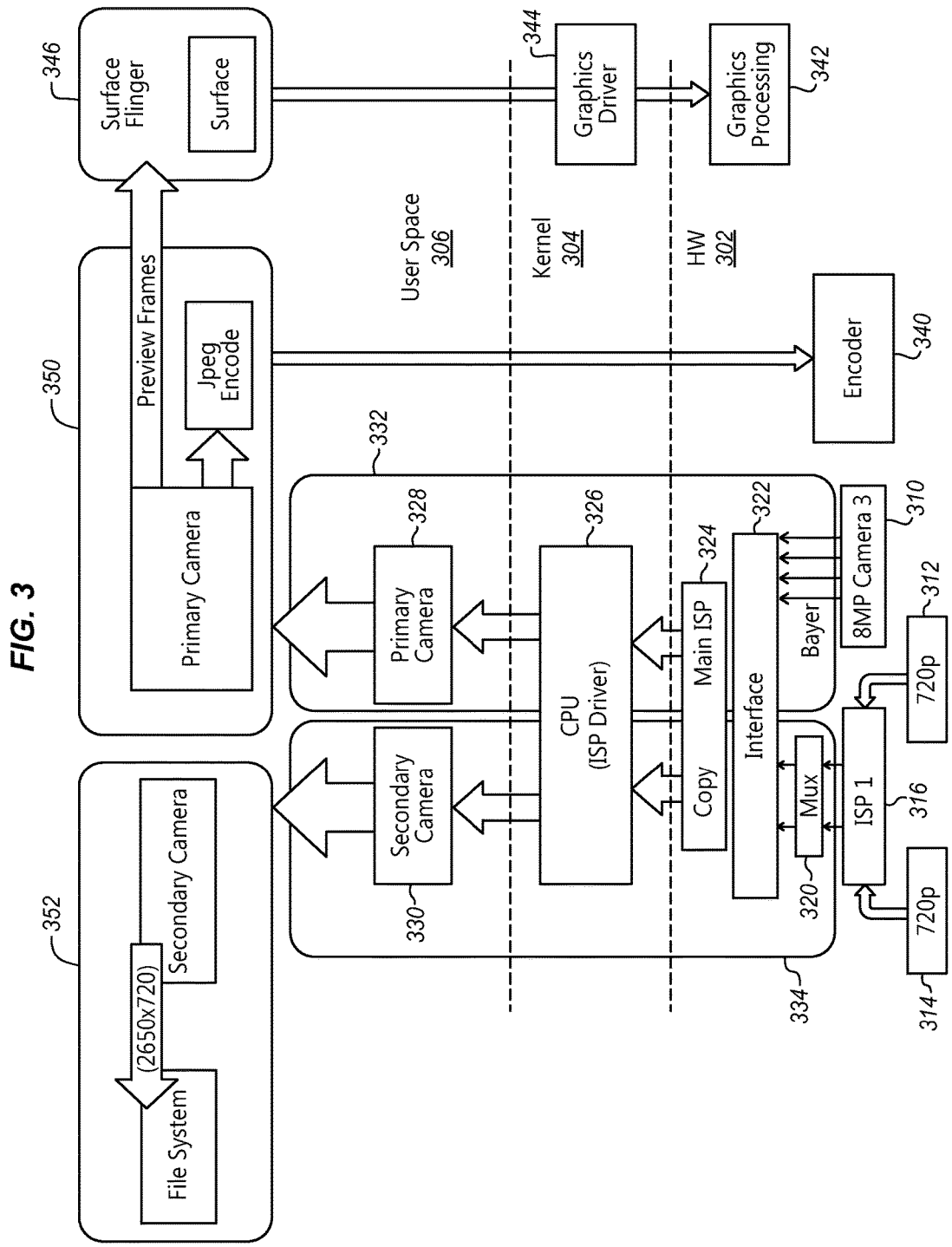
FIG. 3 is a diagram of a software stack for the device of FIG. 2 according to an embodiment.

FIG. 3 is a diagram of an example software stack for the system 220 of FIG. 2. The software stack is built on a hardware layer foundation 302. A kernel layer 304 is built over the hardware layer and a user space 306 is built over the kernel layer. The hardware layer includes a reference camera 310 coupled to an interface 322 to an image signal processor 324 to a CPU 326. The CPU operates the graphics driver for the ISP. Two secondary cameras 312, 314 are coupled to a second image signal processor or frame combiner 316 though a multiplexer 320 to the interface to the main image signal processor. The main ISP is coupled to the same ISP graphics driver through a different port. The front camera (not shown) is also coupled to the multiplexer 320 to allow the system to switch from the front camera to the secondary cameras. The hardware configuration of FIG. 3 is different from that of FIG. 2. Further variations and modifications may be made to suit different implementations.

At the kernel level, the CPU 326 through the graphics driver receives the image sensor data from the cameras and sends it to the user space. In the user space or application layer, there are first 350 and second 352 camera systems, respectively. The primary camera system supports encoding and preview features. The preview features are supplied to a display 346. The encoding is sent to a hardware encoder 340 at the hardware layer. The secondary camera system supports file storage for use by image processing to develop depth data and to support other applications. Finally the support for the display is shown including a hardware level graphics processor 342 and a kernel level graphics driver 344 to provide graphics for the display. There may also be a user input system, such as, buttons, keys, a touchscreen interface in the display 346 or any of a variety of other input systems which provide commands from the user space to the kernel layer.

Since more than two cameras are used to generate a better depth map, frame synchronization between those cameras may be used to provide better depth information. The frames may be synchronized based on frame counters. A hardware connection may be used to provide a frame synchronizing capability that will initiate the start of frames for each camera where the master camera (8 MP) drives the slave cameras (1 MP). So from CSI (Camera Serial Interface) MIPI (from MIPI Alliance) layer, the two streams are exactly synchronized.

After MIPI frames arrive at a CSI receiver, frames may be dropped until the frames are handed over to an application. Frame drops will eventually cause one or more frames to be out of synchronization. For example a broken frame may be discarded by the CSI receiver in one stream. A frame may be dropped by the CSI receiver after not receiving a request from camera FW (Firmware). A frame may be dropped due to a lack of SW (Software) frame buffers from an upper layer. A frame may be disordered due to buffers in different software layers treating the frame differently.

Figure 4:
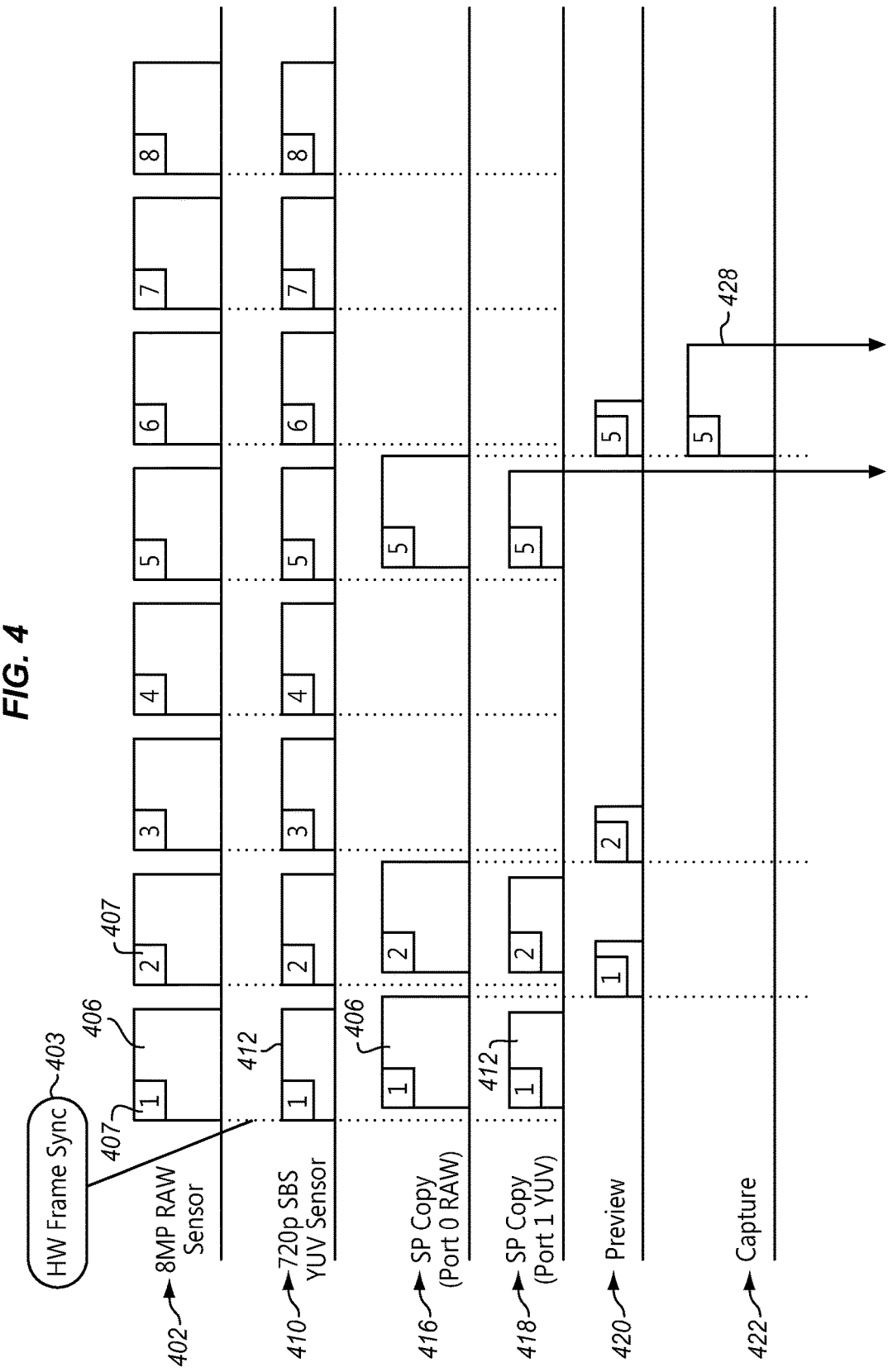
FIG. 4 is a timing diagram of signals transmitted in the device of FIG. 2 according to an embodiment.

All of these reasons for dropping a frame may be resolved by using a frame counter. With a frame counter being passed from camera sensor hardware to camera software, the effects of a frame drop or disorder is solved. A frame counter based synchronization allows individual frames to be tracked from generation through processing. With frame counter values passing from the camera sensor hardware to the camera software, frame drops or disorder may be compensated for. FIG. 4 is a timing diagram to show how a frame counter is used in one embodiment for synchronization.

FIG. 4 shows activity initiated at the reference camera 402. The reference camera receives a command to initiate and capture a sequence of frames. This may be to record video, to capture a photograph, or to run a live view function on a display. The reference camera begins the capture with a sequence 406 of frames. Each frame in the sequence 406 includes metadata 407. The metadata includes a frame counter value together with any other desired information such as time of day, camera parameters, etc. It also sends a hardware frame synchronization signal 404 to the secondary cameras 410. The secondary cameras accordingly also begin to capture a sequence 412 of frames. These frames also include metadata together with the capture image which includes, among other things a frame count based on the synchronization signal.

As shown, the frames are processed through multiple stages. The reference camera frames are received at Port 0 416 of the CPU and are copied for later processing. The secondary camera frames are received at Port 1 418 of the CPU for copying and processing. The reference camera frames may also be sent to the preview display process 420 for presentation on the device display as live view or as a capture image preview. These frames are reconfigured as preview images 426. The frames may also be sent to a capture process 422. At this stage a captured frame from the reference camera is matched with a corresponding frame from the secondary cameras. This combined frame 428 requires that the metadata frame count for all of the frames that are used in the capture be matched.

FIG. 4 shows a timeline in the horizontal direction. The frame capture is synchronized based on the frame synchronization signal 404. The copy operations 416, 418 are also close to synchronized because there are a similar number of operations in both the reference and secondary frame paths from capture to copy. The preview operation 420 introduces some delay and the capture operation introduces more delay. FIG. 4 suggests that when a capture command is applied to frame 1, frame 5 is being previewed and frame 6 is being captured by the cameras. The frame counter metadata allows the frames to be correctly combined and for the correct frame in the sequences 406, 412 of frames to be captured.

The MIPI Camera Serial Interfaces (CSI) 2 specification (promulgated by the MIPI® Alliance) provides an option to embed sensor internal status information in the picture frame to be delivered to a MIPI host. Parameters in the sensor, such as frame counter, can be passed from the sensor to the MIPI host using this option. The bit width of a frame counter in sensor metadata differs from sensor to sensor, however, this may be aligned between two cameras so that the two counters are also in sync. Frame counter may alternatively be delivered in other ways including as metadata, as embedded image data and using a separate line.

The frame synchronization may be accommodated in the camera stack. In one embodiment, two camera instances are created one for each of two camera devices. One of the camera devices is the combined secondary cameras, in this case treated as a single YUV SBS device. The other camera device is the primary camera an 8 MP RAW device. As mentioned previously, the cameras may take many different forms with the same or different resolutions and different image output formats. With this dual camera design, the two camera instances have no knowledge of each other. In some embodiments, synchronization and communication between the two camera instances is not direct. To compensate for this, the camera driver may be used as a bridge to communicate between the two instances and determine synchronization timing. A frame ID listener may be used to notify applications of the frame count of the frame that has been captured.

As an example, an application may start two threads, a primary for the primary instance and a secondary for the secondary cameras. The preview stream from the primary instance will be sent to the display for use as a viewfinder. The buffer for the secondary stream will be cached inside the system software for later synchronization. When a takePicture command is sent to the primary instance, a pause stream command is also sent immediately to the secondary instance. This pause call may be triggered from the driver to the image processor between the secondary cameras in, for example, a hardware abstraction layer of the application. Later when a frame ID has been returned back to the application, this ID is also sent to the secondary instance for synchronization. The application may then call takePicture to get the frame from the secondary instance with that configured ID.

Figure 5:
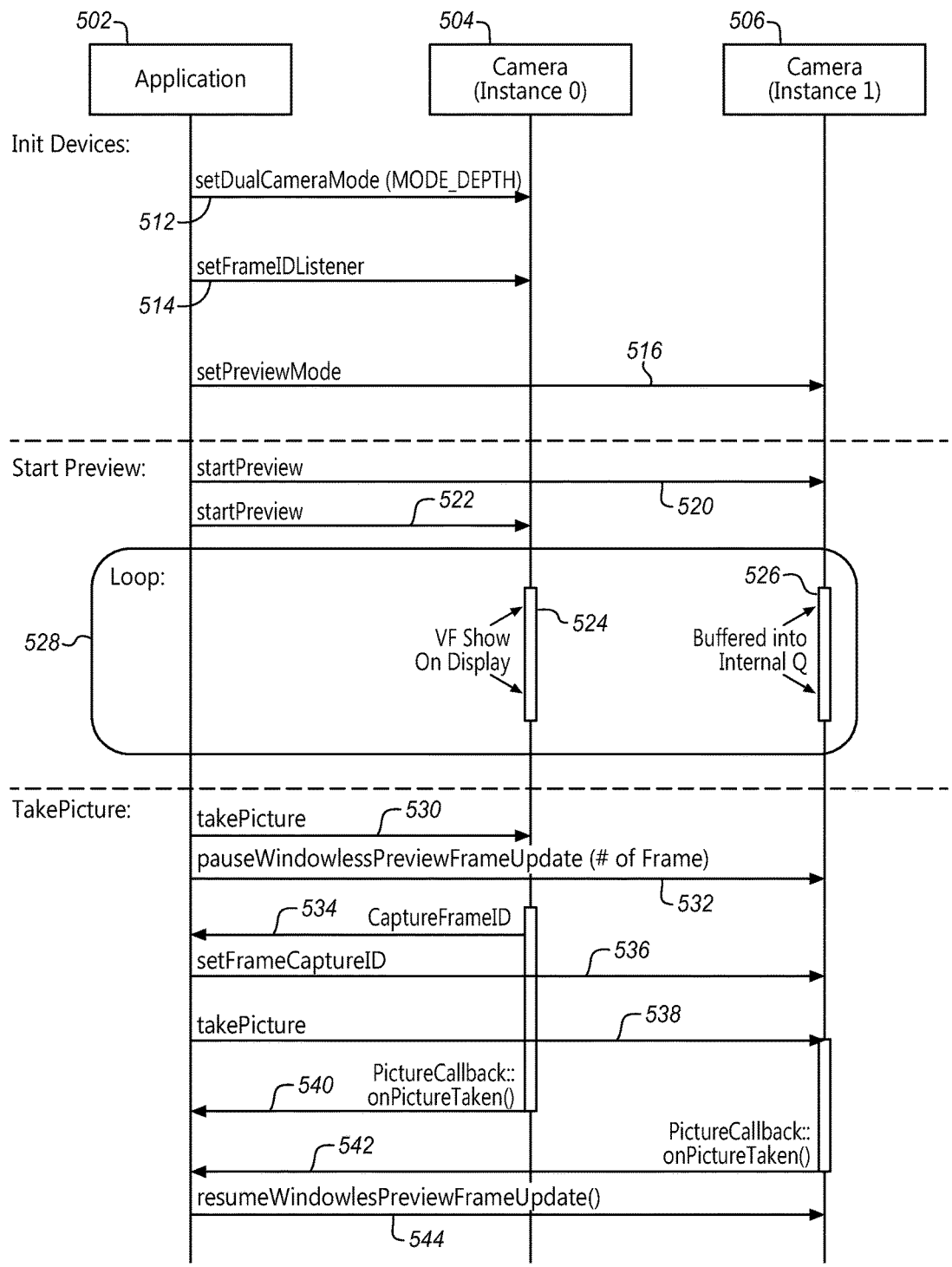
FIG. 5 is a diagram of a sequence of calls for frame capture with multiple camera instances according to an embodiment.

This kind of process is shown as a sequence of calls or commands between a user application 502 and the first 504 and second 506 camera instances in the diagram of FIG. 5. The camera instances correspond to the ports of FIG. 2 by which frames are received by the processor. The process shown in FIGS. 5 and 6 may be modified to operate on different hardware, on different hardware abstraction layers, on different kernels, and on different communication standards. Operations and calls may be added or removed as desired. In addition, some express operations shown here may be automated or implied and other operations that are automatically invoked or triggered and not shown here may be made explicit.

The system starts first with initialization. There may be a variety of different commands to initialize a photography or video mode. In this example, the application sets a depth mode 512 that uses dual camera inputs. Such a message may go to the primary or both camera instances. The application also sets the listener for frame count identifications values 514. The application also sets a preview mode.

After initialization, a preview or live view mode may be used in which a version of the image from the primary camera is displayed on the device's primary screen. The application sends a start preview command 520, 522 to the two instances. Frames received at each instance may then be captured and used by the application. In this example, a loop is established in which frames from the primary instance are rendered 524 on the display while frames from the secondary instance are buffered 526 for use if one of the frames is to be captured.

With the preview operating, a take picture command may be initiated by the user of the device or by any other desired circumstance. A picture may be taken in response to an environmental trigger, a timer, a remote message etc. In the illustrated example, it begins with a take picture command 528 to the primary instance. As mentioned above, the primary camera has synchronized frame capture and frame counts with the secondary cameras so that all of the buffered frames at 526 have metadata indicating a frame number that coincides with the frame numbers of the primary camera.

After the takePicture command 530 is sent to the primary instance, a pause stream command 532 is also sent immediately to the secondary instance. The primary instance, in response to the take picture command, returns 534 a frame ID corresponding to the taken picture back to the application. The returned ID is sent 536 to the secondary instance for synchronization. The application may then send a takePicture call to the secondary instance to get the corresponding buffered frame from the secondary instance. The appropriate frames are received from the first instance 540 and the second instance 542. This allows the system to return to preview mode 544.

Figure 6:
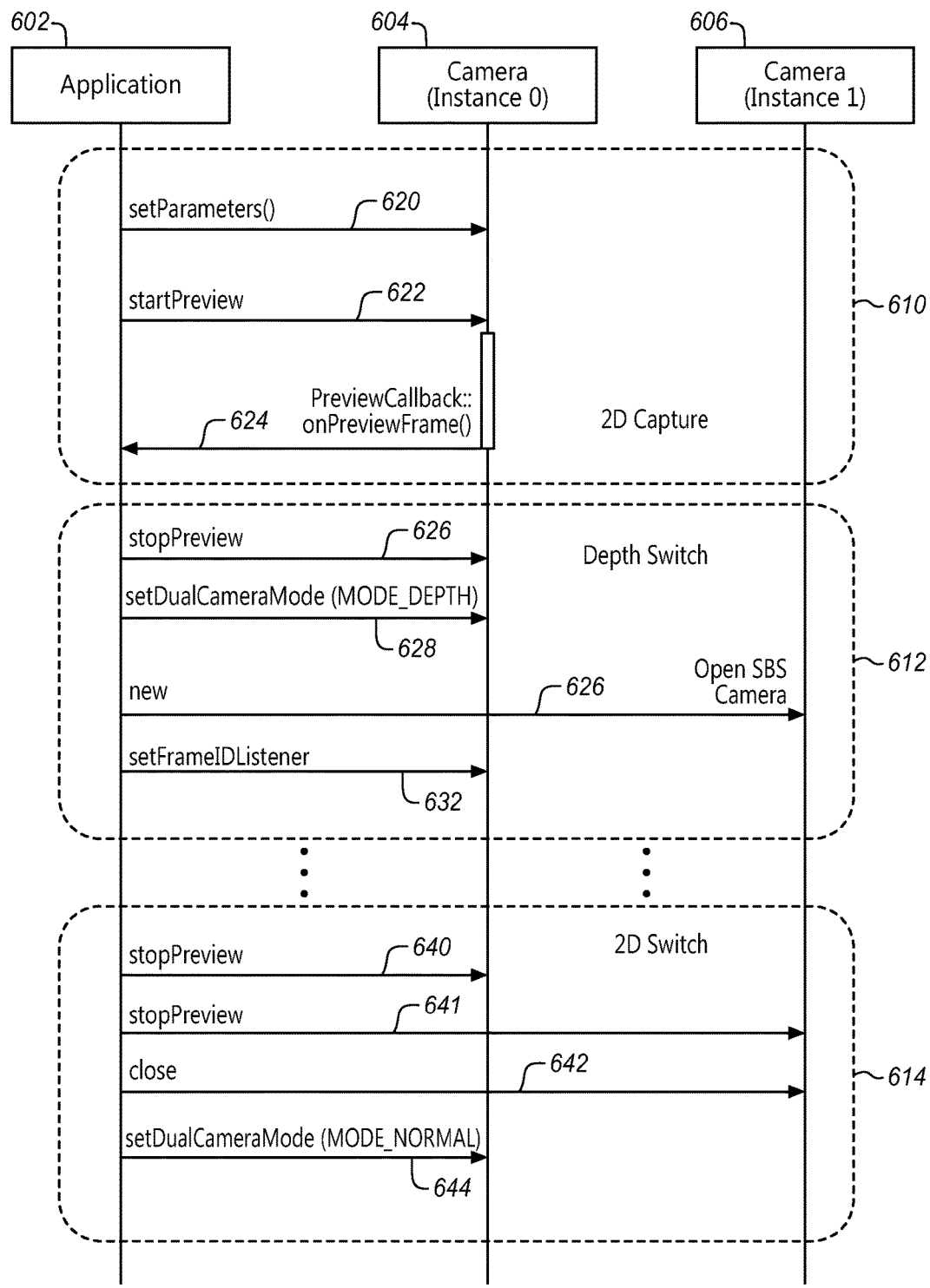
FIG. 6 is a diagram of a sequence of calls for changing modes with multiple camera instances according to an embodiment.

FIG. 6 similarly shows calls between an application 602 and primary and secondary camera instances 604, 606. These calls show a 2D capture 610 using only the primary instance, a depth switch 612 in which the system changes from the 2D mode to the 3D mode and then a 2D switch 614 in which the system changes back to the 2D mode. As described above, these mode changes are associated with a change in the state of the multiplexer 212 of FIG. 2. FIG. 6 shows changes in states with the processor.

For the 2D capture mode 610, the application sets 620 parameters of the primary instance and starts 622 the preview mode. The primary instance supplies the corresponding stream of frames on the display 624 and awaits a take picture command as described above. Notice that for 2D capture the secondary cameras are not required. In some instances, the secondary cameras may still be used for some purpose in addition to depth.

A switch 612 to depth mode from the 2D mode 610 begins with a stop preview command 626 from the application to the primary instance. Since the secondary instance is not active, there is no command to the secondary instance. The application then sets 628 the dual camera mode and depth mode. These setting may be sent to one 628 or both 630 instances. The frame id listener is set 632 and the various commands and replies described in the context of FIG. 5 are performed as described there.

For a switch from 3D depth 612 back to 2D 614 operations may begin again by stopping the preview mode 640. This signal is sent to both instances 640, 641. The application then sets the dual camera mode to normal at 644. This shuts down the stream from the secondary instance and the primary instance and the application then operates as discussed previously.

There are a variety of different ways in which the systems described above and their variations may be used. In one example, the system provides a user with an ability to choose between 3D and 2D shooting modes. When in depth shooting mode outward facing cameras are active and capturing an image will result in a JPEG and a disparity map. Some platform features may not be supported in this mode such as HDR, depending on the particular implementation. When in 2D shooting mode only the primary camera will be active, no depth map will be captured, and all platform imaging features will be supported.

In another example, the cameras may be used to measure a distance between two points in a photo. The device captures a photo with the camera array and then selects two points on the photo. The user is given information on the photo about the distance between the two chosen points.

In another example a photo with measurement information may be shared. After a photo is taken with the camera array and measurement information is determined, the user may choose to share the photo with the measurement information. The image is "flattened" into a JPEG and shared through a gallery using applications that have given their sharing intent.

In another example a gallery application may provide selective filtering. The user selects a region an image and applies a filter to the image. Examples of filters might be blur or black and white.

In another example a photo with selective filters is shared. An image is first filtered then the image is "flattened" into a JPEG and shared through the gallery using applications that have given their sharing intent.

In another example, an original JPEG is shared with depth information. The user may be able to share an original captured JPEG with a depth map through the gallery using applications that have given their sharing intent to the device operating system.

In another example, a gallery may be used with moving image applications. A user may add a parallax effect or any other desired effect to an image where objects at different distances pan and zoom at different rates. The different distances are determined by disparity information based on comparing images from the multiple cameras of the array.

In another example, a user may share a moving image. When a user chooses to share a moving image, an animated GIF (Graphics Interchange Format) or video may be produced and is shared through the gallery using applications that have given their sharing intent.

Figure 7:
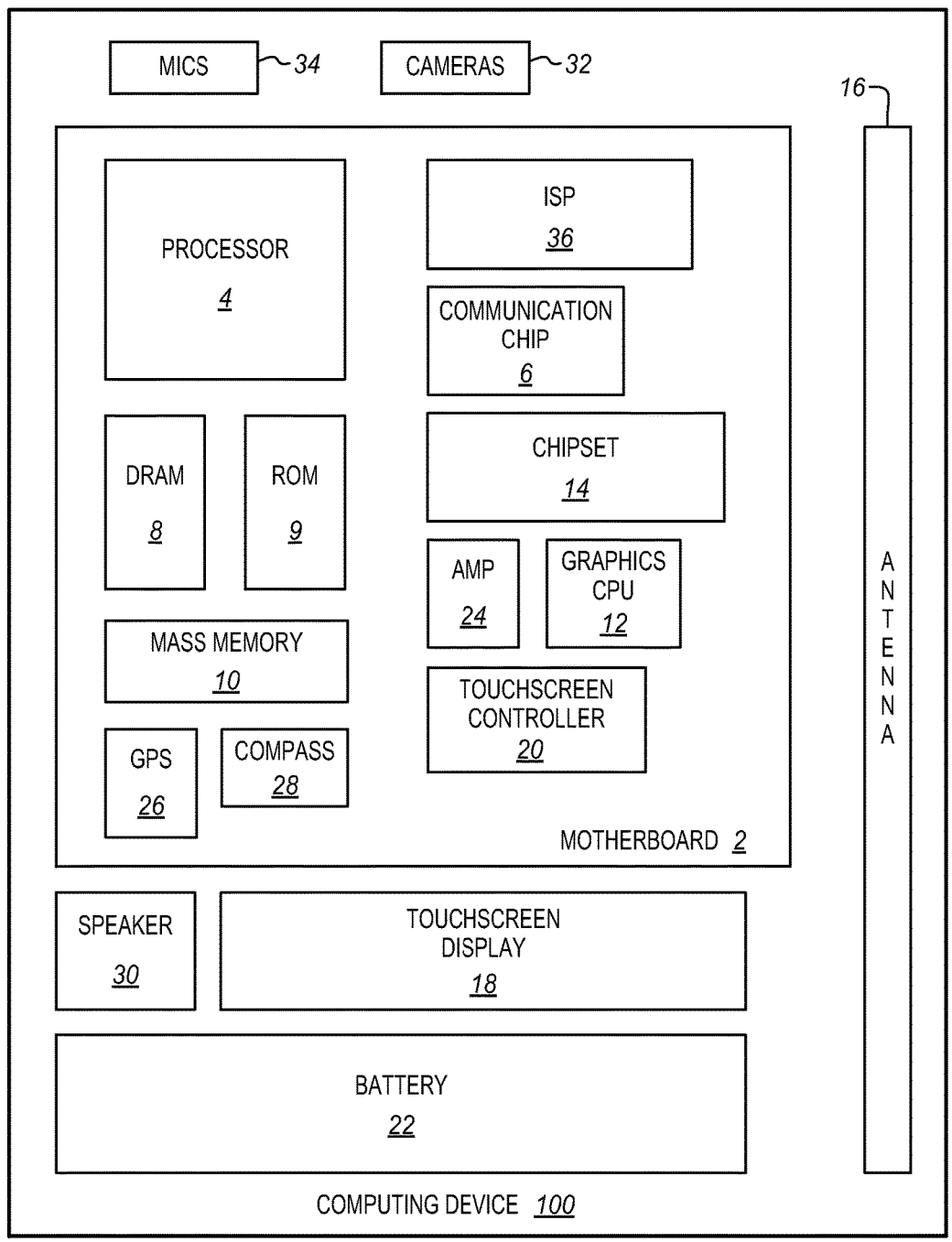
FIG. 7 is a block diagram of a computing device incorporating an image processing system with multiple cameras according to an embodiment.

FIG. 7 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented using the cameras 32 together with the processors 4, 36 and any other desired components which may or may not be shown including one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an imaging device has a primary camera to capture an image of a scene, a secondary camera to capture an image of the same scene, a third camera to capture an image of a second scene, a processor having a first port coupled to the primary camera to receive images from the primary camera and a second port to receive images, and a multiplexer coupled to the secondary camera and to the third camera to receive the captured images and to alternately couple the secondary camera or the third camera to the second port of the processor.

Further embodiments include a second secondary camera and an image processor wherein the first and second secondary cameras are coupled to the image processor, the image processor to receive images from the secondary camera and to combine them into a single image format, wherein the image processor is coupled to the multiplexer to provide the combined image to the multiplexer to be coupled to the processor.

In further embodiments the primary camera is coupled to the processor through a primary camera pipeline, wherein the first and second secondary cameras are coupled to single secondary camera pipeline and wherein the processor receives the primary and the secondary camera pipelines to determine depth in a primary camera frame using the image frames from the secondary camera pipeline.

In further embodiments the primary camera synchronizes the frames of the secondary camera using a synchronization signal.

In further embodiments the secondary camera adds a frame count to each captured frame, the frame count being synchronized to a frame count of the primary camera.

In further embodiments the frame counts are added to metadata of the respective frames and wherein the processor uses the frame counts to process the frames.

Further embodiments include a camera stack to support metadata processing, the camera stack having buffers and drivers coupled to the cameras, wherein the metadata includes a synchronized frame count for the primary and the secondary camera.

Some embodiment pertain to a method that includes receiving a primary image of a scene from a primary image sensor at a first port of a processor, receiving a first secondary image and a second secondary image of the scene from a first secondary image sensor and a second secondary image sensor at a multiplexer and combining the first and second secondary images into a combined secondary image at the multiplexer, and receiving the combined secondary image at a second port of the processor for image processing with the primary image.

In further embodiments image processing comprises determining a depth of points in the primary image using the secondary images by the processor.

Further embodiments include attaching a frame count to the primary image by the primary image sensor, attaching a frame count to the secondary images by the secondary image sensors, wherein receiving the primary image and receiving the combined secondary image comprises receiving the respective frame counts, and wherein the image processor synchronizes the images.

In further embodiments a third camera is coupled to the multiplexer, the method further comprising switching the multiplexer to provide the combined image to the second port or images from the third camera to the second port.

In further embodiments image processing with the combined secondary image comprises depth processing and wherein image processing with images of the third camera comprises image capture without depth processing.

Further embodiments include receiving a user command to alternately determine or not determine depth for the primary image using the secondary images, switching the multiplexer in response to the command, and changing the image processing between a depth processing mode and a third camera image display mode in response to the command.

Further embodiments include showing a preview of the primary image on a screen to a user.

Further embodiments include comprising sending a take picture command to the primary image sensor and wherein the primary image sensor sends a synchronization signal to the secondary image sensors in response to the take picture command.

Some embodiments pertain to a portable device that includes a display, a user interface, a first surface of the device, a plurality of cameras on the first surface, each camera having an image sensor to produce an image, the multiple cameras including a primary camera and at least one secondary camera, the plurality of cameras each configured to capture an image of a single scene, a third camera, a processor having a first port coupled to the primary camera to receive images of the scene from the primary camera and a second port to receive images, and a multiplexer coupled to the secondary camera and to the third camera to receive the captured images and to alternately couple the secondary camera or the third camera to the second port of the processor.

Further embodiments include a primary camera pipeline coupled to the primary camera and to the first port of the processor, and a secondary camera pipeline including the multiplexer coupled to the secondary camera, to the third camera and to the second port of the processor, wherein the processor receives the primary and the secondary camera pipelines to determine depth in a primary camera image using images from the secondary camera pipeline.

In further embodiments the at least one second cameral comprises two secondary cameras on the first surface, wherein images from the secondary cameras have a frame count and wherein the multiplexer combines images from each of the two secondary cameras into a single combined image using the frame counts and provides the combined image to the second port of the processor.

Further embodiments include an application to receive user commands and to set the device to either a 2D mode or a depth mode wherein to switch to the depth mode the application sets the secondary camera to an active state and sets the multiplexer to connect the second camera to the processor.

In further embodiments, wherein the application switches to a third camera mode by sending a pause stream command to the second camera, setting the third camera to active, setting the multiplexer to connect the third camera to the processor, and showing a stream from the third camera on the display.

The invention claimed is:

1. An imaging device comprising:
    a primary camera to capture an image of a scene, the primary camera having a frame synchronization signal line;
    a secondary camera to capture an image of the same scene and coupled to the frame synchronization signal line to capture images synchronized with the primary camera;
    a third camera to capture an image of a second scene without synchronization with the primary camera;
    a processor having a plurality of camera ports, the ports including a first port coupled only to the primary camera to receive images from the primary camera and a second port configured to be coupled to another camera to receive images from the other camera; and
    a multiplexer coupled only to the second port of the processor on an output side and coupled to the secondary camera and to the third camera on an input side to receive captured images of the secondary camera and the third camera and to alternately couple either the secondary camera to the second port of the processor for synchronized capture of the same scene or the third camera to the second port of the processor for capture of the second scene.

2. The device of claim 1, further comprising a second secondary camera and an image processor wherein the first and second secondary cameras are coupled to the image processor, the image processor to receive images from the first and second secondary cameras and to combine them into a single image format, wherein the image processor is coupled to the multiplexer to provide the combined image to the multiplexer to be coupled to the processor.

3. The device of claim 2, wherein the primary camera is coupled to the processor through a primary camera pipeline, wherein the first and second secondary cameras are coupled to single secondary camera pipeline and wherein the processor receives the primary and the secondary camera pipelines to determine depth in a primary camera frame using the image frames from the secondary camera pipeline.

4. The device of claim 1, wherein the primary camera synchronizes the frames of the secondary camera using a synchronization signal.

5. The device of claim 4, wherein the secondary camera adds a frame count to each captured frame, the frame count being synchronized to a frame count of the primary camera.

6. The device of claim 5, wherein the frame counts are added to metadata of the respective frames and wherein the processor uses the frame counts to process the frames.

7. The device of claim 1, further comprising a camera stack to support metadata processing, the camera stack having buffers and drivers coupled to the cameras, wherein the metadata includes a synchronized frame count for the primary and the secondary camera.

8. A method comprising
    receiving a primary image of a scene from a primary image sensor at a first port of a processor, the first port being coupled only to the primary image sensor;
    receiving a first secondary image and a second secondary image of the scene from a first secondary image sensor and a second secondary image sensor at a combiner, wherein the first and second secondary image are frame synchronized with the primary image, and combining the first and second secondary images into a combined secondary single image by placing the first and secondary images side-by-side at the combiner; and
    receiving the combined secondary image at a second port of the processor for image processing with the primary image, the second port being coupled to the combiner through a multiplexer, the processor having fewer ports than there are image sensors.

9. The method of claim 8, wherein image processing comprises determining a depth of points in the primary image using the secondary images by the processor.

10. The method of claim 8, further comprising attaching a frame count to the primary image by the primary image sensor, attaching a frame count to the secondary images by the secondary image sensors, wherein receiving the primary image and receiving the combined secondary image comprises receiving the respective frame counts, and wherein the image processor synchronizes the images.

11. The method of claim 8, wherein a third camera is coupled to the multiplexer, the method further comprising switching the multiplexer to provide the combined image to the second port or images from the third camera to the second port.

12. The method of claim 1, wherein image processing with the combined secondary image comprises depth processing and wherein image processing with images of the third camera comprises image capture without depth processing.

13. The method of claim 1, further comprising receiving a user command to alternately determine or not determine depth for the primary image using the secondary images, switching the multiplexer in response to the command, and changing the image processing between a depth processing mode and a third camera image display mode in response to the command.

14. The method of claim 8, further comprising showing a preview of the primary image on a screen to a user.

15. The method of claim 14, further comprising sending a take picture command to the primary image sensor and wherein the primary image sensor sends a synchronization signal to the secondary image sensors in response to the take picture command.

16. A portable device comprising:
a display;
a user interface;
a first surface of the device;
a plurality of cameras on the first surface, each camera having an image sensor to produce an image, the multiple cameras including a primary camera, having a frame synchronization signal line, and at least one secondary camera, the plurality of cameras each configured to capture an image of a single scene, the secondary camera being coupled to the frame synchronization signal line to capture images synchronized with the primary camera;
a third camera;
a processor having a plurality of camera ports, the ports including a first port coupled only to the primary camera to receive images of the scene from the primary camera and a second port configured to be coupled to another camera to receive images from the other camera; and
a multiplexer coupled only to the second port of the processor on an output side and coupled to the secondary camera and to the third camera on an input side to receive captured images of the secondary camera and the third camera and to alternately couple either the secondary camera to the second port of the processor for synchronized capture of the same scene or the third camera to the second port of the processor for capture of the second scene.

17. The device of claim 16, further comprising:
a primary camera pipeline coupled to the primary camera and to the first port of the processor; and
a secondary camera pipeline including the multiplexer coupled to the secondary camera, to the third camera and to the second port of the processor,
wherein the processor receives the primary and the secondary camera pipelines to determine depth in a primary camera image using images from the secondary camera pipeline.

18. The device of claim 16 wherein the at least one second camera comprises two secondary cameras on the first surface, wherein images from the secondary cameras have a frame count and wherein the multiplexer combines images from each of the two secondary cameras into a single combined image using the frame counts and provides the combined image to the second port of the processor.

19. The device of claim 16, further comprising an application to receive user commands and to set the device to either a 2D mode or a depth mode wherein to switch to the depth mode the application sets the secondary camera to an active state and sets the multiplexer to connect the second camera to the processor.

20. The device of claim 16, wherein the application switches to a third camera mode by sending a pause stream command to the second camera, setting the third camera to active, setting the multiplexer to connect the third camera to the processor, and showing a stream from the third camera on the display.

* * * * *